United States Patent
Jung et al.

(10) Patent No.: US 11,775,319 B2
(45) Date of Patent: Oct. 3, 2023

(54) METHOD FOR PRELOADING APPLICATION BASED ON HISTORY AND CONDITION AND ELECTRONIC DEVICE SUPPORTING SAME

(71) Applicant: Samsung Electronics Co., Ltd., Suwon-si (KR)

(72) Inventors: Youngjoo Jung, Suwon-si (KR); Jaemin Ko, Suwon-si (KR); Jiman Kwon, Suwon-si (KR); Byoungkug Kim, Suwon-si (KR); Hakryoul Kim, Suwon-si (KR); Hongjung Son, Suwon-si (KR); Jihan Yun, Suwon-si (KR); Dongwook Lee, Suwon-si (KR); Changho Lee, Suwon-si (KR); Youngjun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 18 days.

(21) Appl. No.: 16/951,914

(22) Filed: Nov. 18, 2020

(65) Prior Publication Data

US 2021/0149689 A1 May 20, 2021

(30) Foreign Application Priority Data

Nov. 18, 2019 (KR) .................... 10-2019-0147982

(51) Int. Cl.
*G06F 9/445* (2018.01)
*G06N 7/01* (2023.01)

(52) U.S. Cl.
CPC .......... *G06F 9/44578* (2013.01); *G06N 7/01* (2023.01)

(58) Field of Classification Search
CPC ....... G06F 9/44578; G06N 3/08; G06N 7/005
See application file for complete search history.

(56) References Cited

U.S. PATENT DOCUMENTS 8,112,755 B2  2/2012  Apacible et al.
9,760,399 B1  9/2017  Fraser et al.
(Continued)

FOREIGN PATENT DOCUMENTS

CN  109656722 A  4/2019

OTHER PUBLICATIONS

International Search Report and Written Opinion of the International Searching Authority in connection with International Application No. PCT/KR2020/016270 dated Mar. 17, 2021, 8 pages.
(Continued)

*Primary Examiner* — Jorge A Chu Joy-Davila

(57) ABSTRACT

An embodiment discloses an electronic device including: a first memory in which multiple applications are stored; a second memory; and at least one processor operatively connected to the first memory and the second memory. The processor(s) is configured to determine, based on a history of usage of the multiple applications for a first period of time, a priority of the multiple applications over multiple time intervals included in a second period of time. The processor(s) is further configured to preload a predetermined first number of applications into the second memory based on the priority if a designated condition being satisfied; and preload a first list of applications into the second memory if the designated condition is satisfied in a first time interval, and preload a second list of applications into the second memory if the designated condition is satisfied in a second time interval.

16 Claims, 10 Drawing Sheets

(56) References Cited

U.S. PATENT DOCUMENTS

| | | | |
|---|---|---|---|
| 10,261,938 B1 | 4/2019 | Jenkins et al. | |
| 2011/0004505 A1* | 1/2011 | Pan | G06Q 30/0267 |
| | | | 705/26.1 |
| 2012/0047509 A1* | 2/2012 | Ben-Itzhak | G06F 9/50 |
| | | | 718/103 |
| 2012/0167122 A1* | 6/2012 | Koskimies | G06F 9/5027 |
| | | | 719/328 |
| 2013/0082742 A1* | 4/2013 | Ren | H02M 1/32 |
| | | | 327/198 |
| 2013/0311751 A1* | 11/2013 | Kurihara | G06F 9/44521 |
| | | | 712/28 |
| 2014/0373032 A1 | 12/2014 | Merry et al. | |
| 2015/0324137 A1* | 11/2015 | Wu | G06F 3/0619 |
| | | | 713/2 |
| 2016/0117260 A1* | 4/2016 | Wu | G06F 12/023 |
| | | | 713/193 |
| 2016/0224397 A1* | 8/2016 | Arora | G06F 9/485 |
| 2016/0364272 A1 | 12/2016 | Hou et al. | |
| 2017/0046171 A1* | 2/2017 | Jung | G06F 9/4403 |
| 2017/0277462 A1 | 9/2017 | Zhang et al. | |
| 2019/0155619 A1 | 5/2019 | Chen | |
| 2019/0188007 A1 | 6/2019 | Chen et al. | |
| 2019/0347113 A1 | 11/2019 | Ma et al. | |
| 2020/0342338 A1* | 10/2020 | Huang | G06F 9/44578 |
| 2021/0073008 A1* | 3/2021 | Park | H04M 1/72451 |

OTHER PUBLICATIONS

Supplementary European Search Report dated Sep. 26, 2022, in connection with European Application No. 20890983.8, 12 pages.

\* cited by examiner

| Physical Mem | S. Light | Light | Normal | Heavy | S. Heavy |
|---|---|---|---|---|---|
| 12GB | 18 | 16 | 14 | 6 | 3 |
| 8GB | 14 | 12 | 10 | 5 | 2 |
| 6GB | 12 | 10 | 8 | 4 | 1 |
| 4GB | 10 | 8 | 6 | 3 | 0 |
| 3GB | 6 | 6 | 5 | 0 | 0 |
| 2GB | 4 | 4 | 4 | 0 | 0 |

| State | Memory Parameter |
|---|---|
| Super Light | Background: Normal identical<br>swap : swappiness 110<br>I/O : ReadAround 250K/130K, FaultAround 60K<br>MAX_TASK_SNAPSHOT : 25 / 5 |
| Light | Background: CACHED MAX 20% ↑<br>swap : swappiness 120<br>I/O : ReadAround 250K/ 130K, FaultAround 60K ↑<br>MAX_TASK_SNAPSHOT : 25 / 5 |
| Heavy | Background: CACHED MAX/MIN 20 % ↓<br>swap : swappiness 150<br>I/O : ReadAround 60K/30K, FaultAround 5K<br>MAX_TASK_SNAPSHOT : 3 |
| Super Heavy | Background: CACHED MAX/MIN 40 % ↓, No White List<br>swap : swappiness 160<br>I/O : ReadAround 60K/30K, FaultAround 5K<br>MAX_TASK_SNAPSHOT : 2 |
| Normal | default |

FIG.7

METHOD FOR PRELOADING APPLICATION BASED ON HISTORY AND CONDITION AND ELECTRONIC DEVICE SUPPORTING SAME

CROSS-REFERENCE TO RELATED APPLICATION

This application is based on and claims priority under 35 U.S.C. 119 to Korean Patent Application No. 10-2019-0147982, filed on Nov. 18, 2019, in the Korean Intellectual Property Office, the disclosure of which is herein incorporated by reference in its entirety.

BACKGROUND

1. Field

Various embodiments disclosed in this document relate to a method for preloading an application and an electronic device supporting the same.

2. Description of Related Art

Nowadays, electronic devices provide various functions or services based on convergence of various information communication technologies (so-called digital convergence). Accordingly, there have been proposed technologies for improving the performance of applications that are critical to operating functions or services of the electronic devices. For example, in order to improve the rate of response to a request for execution (or entry) of an application, an electronic device may support a function of preloading at least a part of the application in a memory.

The above information is presented as background information only to assist with an understanding of the disclosure. No determination has been made, and no assertion is made, as to whether any of the above might be applicable as prior art with regard to the disclosure.

SUMMARY

During an application preloading operation, an electronic device may forecast an application to be executed at a later timepoint, based on context information regarding the electronic device, may calculate a conditional probability according to the forecast, and may preload, into a memory thereof, a specified number of applications or applications, the number of which is allowed according to the memory capacity.

However, the above-mentioned application preloading based on context information has a problem in that the validity of a preloaded application may not last due to a frequent change in the context information, or the group of application candidates to be preloaded may need to be frequently updated according to the changed context information, thereby incurring an overhead.

Various embodiments disclosed in this document disclose a method for preloading an application and an electronic device supporting the same, wherein the validity of preloading performed based on an application execution forecast can be maintained for a designated period of time.

An electronic device, according to an embodiment, may include: a first memory in which multiple applications are stored; a second memory; and at least one processor operatively connected to the first memory and the second memory.

According to an embodiment, the at least one processor may determine, based on a history of usage of the multiple applications for a first period of time, a priority of the multiple applications with regard to each of multiple time intervals included in a second period of time following the first period of time, may preload a predetermined first number of applications into the second memory based on the priority if a designated condition is satisfied, and may preload a first list of applications into the second memory if the designated condition is satisfied in a first time interval among the multiple time intervals, and preload a second list of applications into the second memory if the designated condition is satisfied in a second time interval among the multiple time intervals.

A method for preloading an application of an electronic device, according to an embodiment, may include the operations of: determining, based on a history of usage of multiple applications stored in a first memory for a first period of time, a priority of the multiple applications with regard to each of multiple time intervals included in a second period of time following the first period of time; and preloading a predetermined first number of applications into the second memory based on the priority if a designated condition is satisfied.

According to an embodiment, the operation of preloading a predetermined first number of applications into the second memory may include an operation of preloading a first list of applications into the second memory if the designated condition is satisfied in a first time interval among the multiple time intervals, and preloading a second list of applications into the second memory if the designated condition is satisfied in a second time interval among the multiple time intervals.

According to various embodiments, based on preloading of an application, the time necessary for execution (or entry) of the application may be reduced, and the response rate of the electronic device may be improved.

According to various embodiments, execution of an application may be forecasted with regard to each time interval inside a designated period of time, thereby improving the validity of application preloading performed with regard to a specific time interval.

Other various advantageous effects identified directly or indirectly through this documents may be provided.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates a diagram an example of determining the number of first slots in connection with an electronic device, according to an embodiment;

FIG. 7 illustrates a diagram of exemplary memory parameters based on the memory state of an electronic device, according to an embodiment;

In connection with the description of the drawings, identical or corresponding components may be given identical reference numerals.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure are disclosed with reference to the accompanying drawings. However, the present disclosure is not intended to be limited by the various embodiments of the present disclosure to a specific embodiment and it is intended that the present disclosure covers all modifications, equivalents, and/or alternatives of the present disclosure provided they come within the scope of the appended claims and their equivalents.

Figure 1:
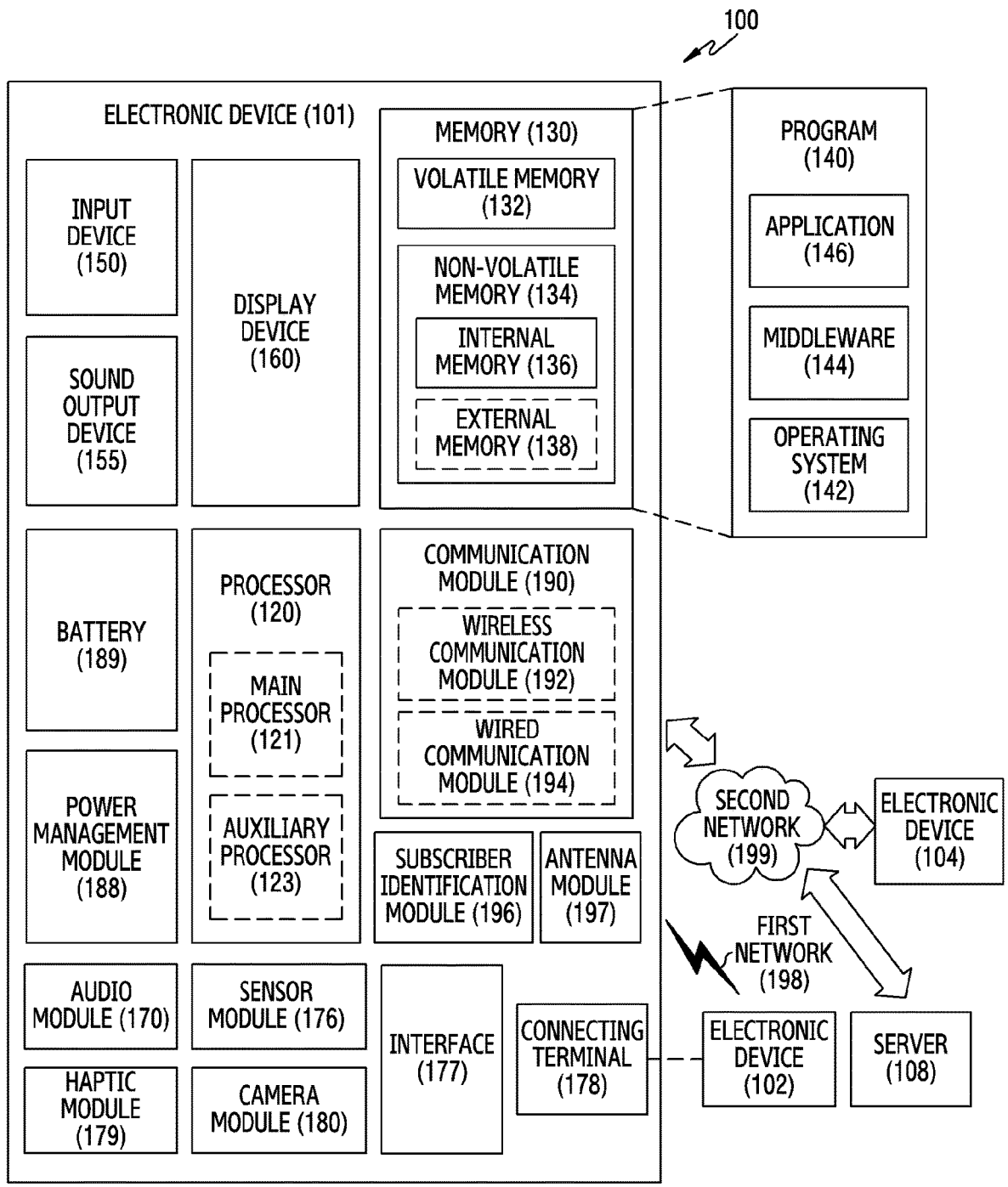
FIG. 1 illustrates a diagram of an example electronic device inside a network environment, according to an embodiment.

FIG. 1 illustrates a diagram of an example of an electronic device inside a network environment, according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding to one of the display, the hologram device, and the projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
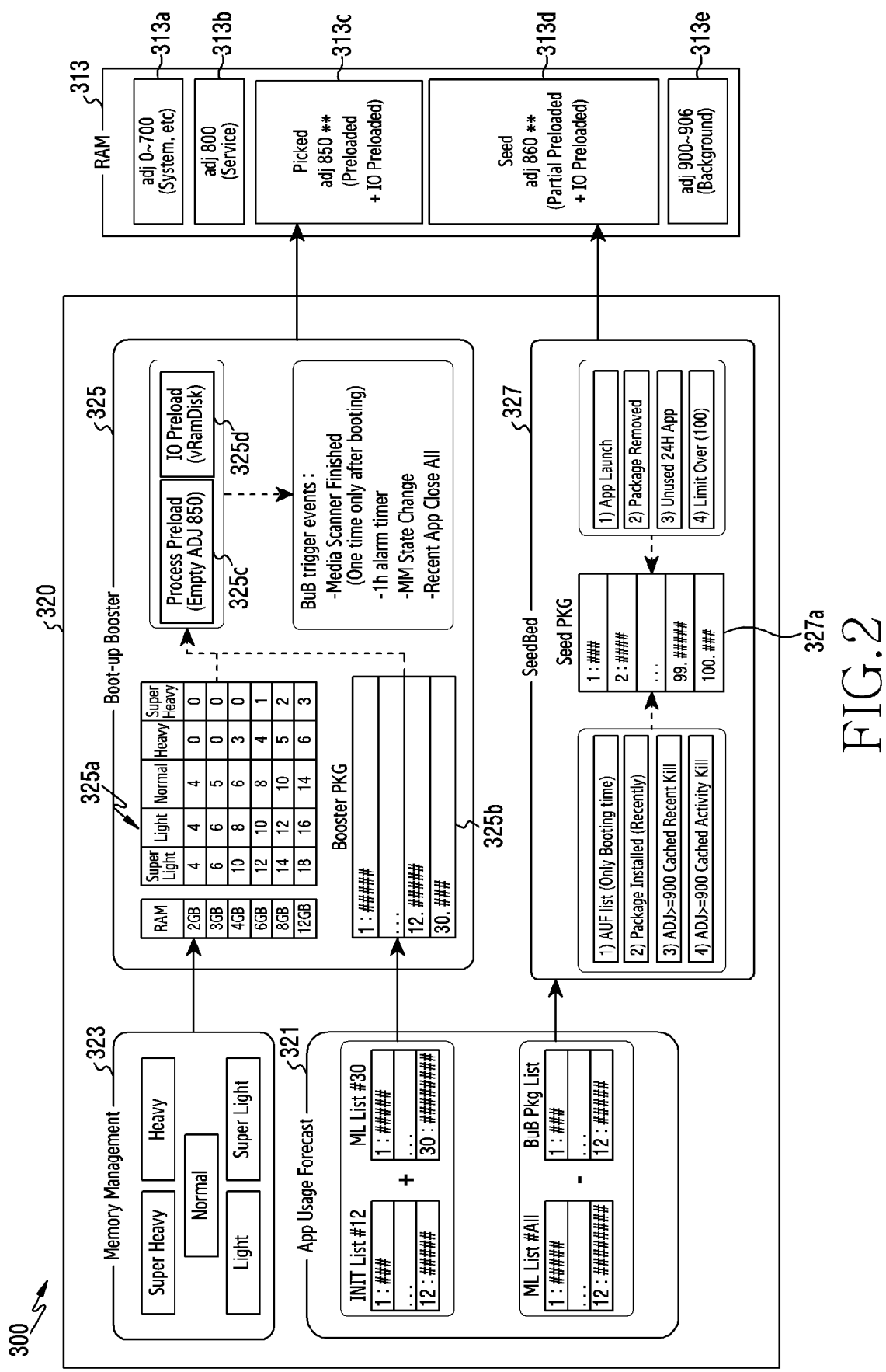
FIG. 2 illustrates a diagram of some example components of an electronic, device according to an embodiment.

FIG. 2 illustrates a diagram of some example components of an electronic device, according to an embodiment.

Referring to FIG. 2, the electronic device 300, according to an embodiment, may include a processor 320 and a second memory 313 (RAM). The processor 320 may include at least one of an app usage forecast module 321, a memory management module 323, a boot-up booster module 325, and a seedbed module 327.

According to various embodiment, the electronic device 300 may further include components other than the above-mentioned components. For example, the electronic device 300 may further include a first memory (not illustrated) configured to store multiple applications. In addition, the electronic device 300 may further include at least some of the components of the electronic device (for example, electronic device 101 in FIG. 1) mentioned with reference to FIG. 1. In such a case, the first memory and the second memory 313 may correspond to the nonvolatile memory (for example, the nonvolatile memory 134 in FIG. 1) and the volatile memory (for example, the volatile memory 132 in FIG. 1) included in the electronic device 101 in FIG. 1, respectively.

According to an embodiment, the processor 320 (for example, the processor 120 in FIG. 1) may be implemented as at least one of a central processing unit, an application processor, and a communication processor, thereby controlling components of the electronic device 300 described above. For example, the processor 320 may be connected to the components of the electronic device 300 electrically or operatively such that the processor 320 can deliver, to the components, at least one command related to the function/operation of the corresponding components, and can perform operation or processing regarding data delivered from the components.

According to an embodiment, at least one of the app usage forecast module 321, the memory management module 323, the boot-up booster module 325, and the seedbed module 327 included in the processor 320 may perform a function/operation related to the corresponding module under the control of the processor 320. According to another embodiment, at least one of the app usage forecast module 321, the memory management module 323, the boot-up booster module 325, and the seedbed module 327 may be configured independently of the processor 320 so as to autonomously perform a function/operation related to the corresponding module. According to still another embodiment, at least one of the app usage forecast module 321, the memory management module 323, the boot-up booster module 325, and the seedbed module 327 may be omitted, and the processor 320 may instead perform the function/operation of the omitted module.

According to an embodiment, at least some of multiple applications stored in the first memory (for example, the nonvolatile memory 134 in FIG. 1) may be loaded into the second memory 313 (for example, the volatile memory 132 in FIG. 1). In this regard, in order to determine at least one application to be loaded into the second memory 313, the processor 320 may determine multiple loading priorities regarding the loading, may define the number of applications (for example, processes of applications) that are loadable with regard to a specific loading priority as a system parameter referred to as "max slot", and may manage the same. When a specific application is loaded, one of at least one slot defined with regard to the corresponding loading priority may be assigned to the specific application. During this operation, if the at least one slot has all been already assigned with regard to loading of another application, loading of the specific application may be processed according to the rule of the corresponding loading priority. For example, among at least one other application to which the at least one slot has been assigned, an application that has long been loaded may be unloaded, and a slot secured as a result may be assigned to the specific application.

According to an embodiment, the multiple loading priorities may include a first loading priority 313a, a second loading priority 313b, a third loading priority 313c, a fourth loading priority 313d, and a fifth loading priority 313e.

According to various embodiments, according to each of the first loading priority 313a, the second loading priority 313b, and the fifth loading priority 313e, process data of at least one application, to which a priority is assigned by means of an algorithm (for example, least recently used algorithm) following the policy of the operating system (for example, Android) of the electronic device 300, may be loaded. For example, according to the first loading priority 313*a* (for example, adj 0 to adj 700), process data of at least one system application may be loaded; according to the second loading priority 313*b* (for example, adj 800), process data of at least one service application may be loaded; and according to the fifth loading priority 313*e* (for example, adj 900 to adj 906), process data of at least one background application may be loaded. Such loading according to the first loading priority 313*a*, the second loading priority 313*b*, or the fifth loading priority 313*e* may be performed after execution of the corresponding application, and no preloading may be performed prior to the execution. According to an embodiment, the preloading may refer to an operation wherein, in order to improve the rate of execution (or entry) of an application, a resource necessary to execute the application or information necessary for various kinds of operations is loaded into the volatile memory (for example, the volatile memory 132 in FIG. 1, or the second memory 313) before the application is executed.

According to an embodiment, the processor 320 may preload at least some of the multiple applications stored in first the memory, based on an execution forecast, into the second memory 313 according to the third loading priority 313*c* (for example, adj 850) and the fourth loading priority 313*d* (for example, adj 860). In this regard, the processor 320 may determine at least one application to be preloaded according to the third loading priority 313*c* and at least one application to be preloaded according to the fourth loading priority 313*d*, by using at least one of the app usage forecast module 321, the memory management module 323, the boot-up booster module 325, and the seedbed module 327. If a preloading condition designated with regard to the third loading priority 313*c* or a preloading condition designated with regard to the fourth loading priority 313*d* is satisfied, the processor 320 may preload process data (for example, application package) related to at least one application, which has been determined to be preloaded, into at least one slot (for example, picked process slot or seedbed process slot) inside the second memory 313 related to the corresponding loading priority.

According to various embodiments, pieces of process data of applications that are loaded into the second memory 313 according to the first loading priority 313*a*, the second loading priority 313*b*, the third loading priority 313*c*, the fourth loading priority 314*d*, and the fifth loading priority 313*e* described above may be stored in the second memory 313 with no separate space distinction. Alternatively, pieces of process data of applications loaded into the second memory 313 may be distinguished according to the corresponding loading priorities and separately stored in virtual address areas of the second memory 313.

Hereinafter, various embodiments related to application preloading according to the third loading priority 313*c* and the fourth loading priority 313*d* will be described with reference to FIG. 2 and other drawings.

Figure 3:
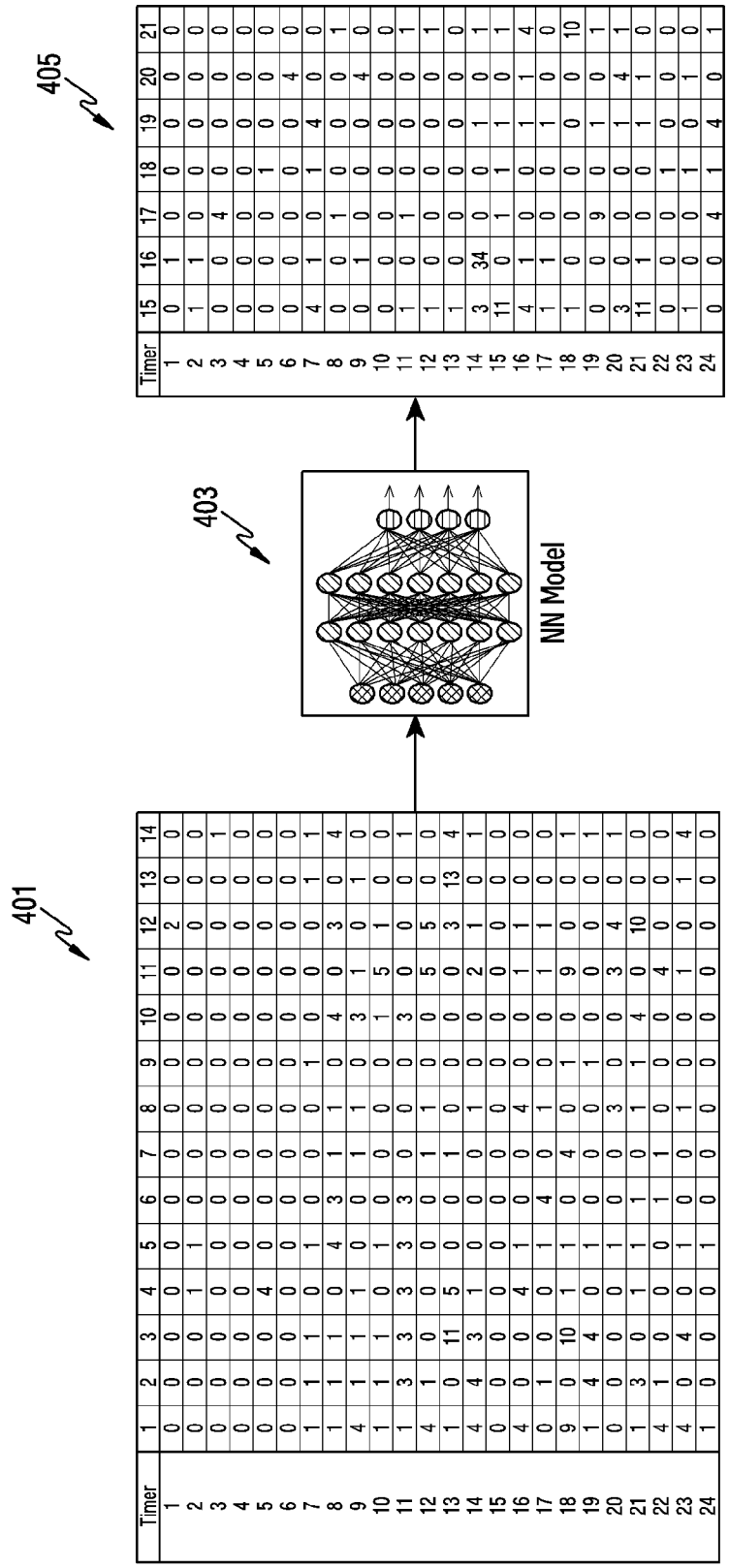
FIG. 3 illustrates a diagram of an example of order determination regarding preloading target applications of an electronic device, according to an embodiment.

FIG. 3 illustrates a diagram of an example of order determination regarding preloading target applications of an electronic device, according to an embodiment.

Referring to FIG. 2 and FIG. 3, the app usage forecast module 321 may infer at least one application to be preloaded into the second memory 313 (for example, the volatile memory 132 in FIG. 1) according to the third loading priority 313*c* and the fourth loading priority 313*d*, and may produce a priority list regarding at least one application based on the inference. For example, the app usage forecast module 321 may infer at least one application that is supposed to be the preloading target for a designated time (for example, one hour)/at a designated cycle (for example, second cycle) at a timepoint at which booting of the electronic device 300 is completed (for example, timepoint at which "media scanner finished intent" is received).

According to an embodiment, the app usage forecast module 321 may learn, as at least a part of the inference, a pattern of association between the history of execution of at least one application for a first period of time (for example, for two weeks preceding a reference timepoint) (for example, the number of executions for each of multiple time intervals included in the two preceding weeks) and the history of execution thereof for a second period of time (for example, for one week after the reference timepoint) following the first period of time, based on big data information related to application usage history. In this regard, the app usage forecast module 321 may include a neural network model made of a recent network based on a fully connected layer system, and a week network for learning week and hour patterns. In an embodiment, the app usage forecast module 321 may input data 401 regarding the history of execution of a specific application for the first period of time to the neural network model 403, and may acquire output data 405 from the neural network model 403. According to an embodiment, the output data 405 may be produced based on the learning, and may include information regarding the number of executions of the specific application forecasted for a second period of time (for example, for one week after the current timepoint) following the first period of time with regard to each of multiple time intervals included in the second period of time.

According to an embodiment, the app usage forecast module 321 may acquire output data based on a neural network model with regard to at least one application having a history of execution for the first period of time, and may compare pieces of output data corresponding to respective applications. The app usage forecast module 321 may enumerate the at least one application having a history of execution for the first period of time in such an order that applications forecasted to have a large number of executions with regard to respective multiple time intervals inside the second period of time come first, thereby producing a priority list. Based thereon, the priority list may include a list of at least one application enumerated in such an order that applications forecasted to have a large number of executions with regard to a first time interval inside the second period of time come first, and may include a list of at least one application enumerated in such an order that applications forecasted to have a large number of executions with regard to a second time interval, which is different from the first time interval, come first. According to an embodiment, the app usage forecast module 321 may deliver the produced priority list to the boot-up booster module 325 for a designated time (for example, one hour)/at a designated cycle (for example, second cycle) for which at least one application to be preloaded is inferred. In addition, the app usage forecast module 321 may deliver the produced priority list to the seedbed module 327 at a timepoint at which booting of the electronic device 300 is completed.

According to various embodiments, the processor 320 may include a micro controller unit. In such a case, the processor 320 may similarly perform inference regarding at least one application to be preloaded, which is performed by the app usage forecast module 321, by using a machine learning algorithm. For example, the processor 320 may input the history of at least one application executed for a first period of time to the machine learning algorithm, and may produce a priority list based on applications having a large number of executions forecasted with regard to each of multiple time intervals inside a second period of time, which are output from the machine learning algorithm. According to various embodiments, the inference regarding at least one application to be preloaded, which is performed by the app usage forecast module 321, may be performed by the processor 320, a neural network processor included in an auxiliary processor (for example, the auxiliary processor 123 in FIG. 1), an operation module capable of a fast parallel operation, or a combination of at least two thereof.

Figure 4:
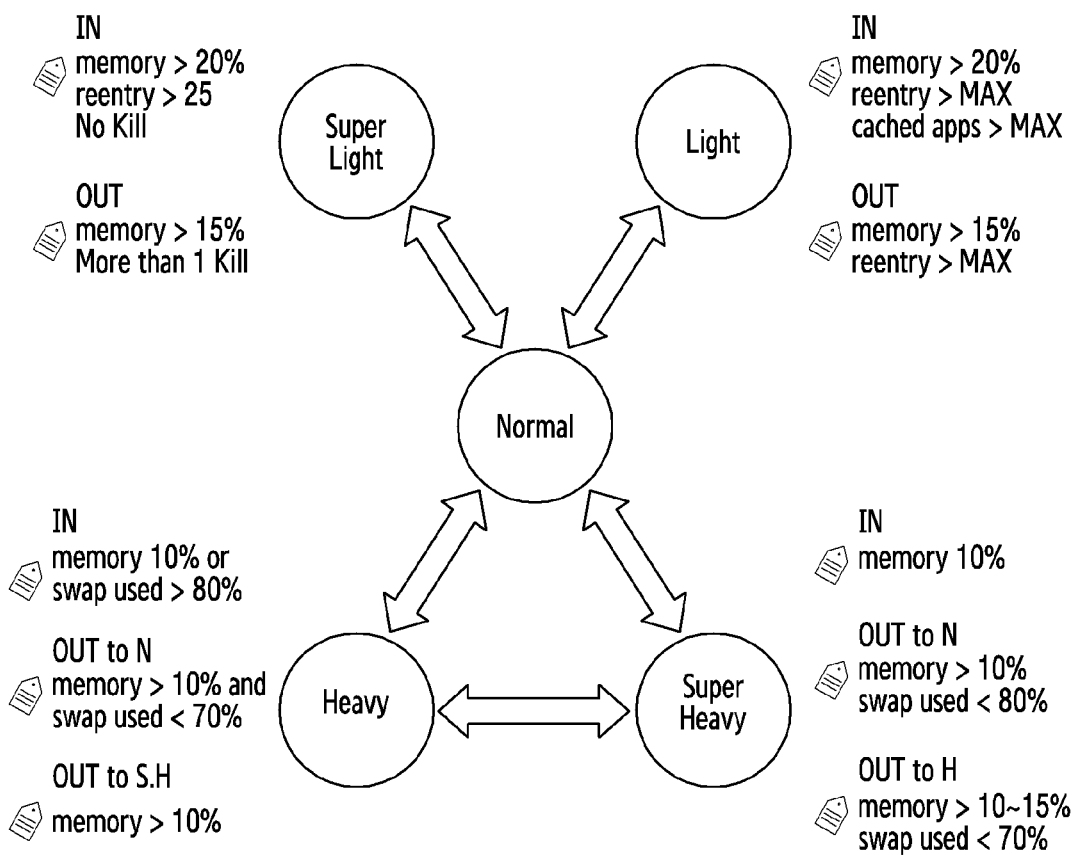
FIG. 4 illustrates a diagram an example of determining the memory state of an electronic device, according to an embodiment.

FIG. 4 illustrates a diagram of an example of determining the memory state of an electronic device, according to an embodiment.

Referring to FIG. 2 and FIG. 4, the memory management module 323 may monitor the pattern of employment of the second memory 313, thereby determining the state of the second memory 313. For example, the memory management module 323 may determine the state of the second memory 313 at each cycle (for example, first cycle) at which the number of times an application is executed by the electronic device 300 exceeds a threshold (for example, 20 times). According to an embodiment, the state of the second memory 313 may refer to the manner (or pattern) in which the user of the electronic device 300 employs the second memory 313, and the memory management module 323 may determine that the state of the second memory 313 is one of a first state (for example, normal), a second state (for example, light), a third state (for example, super light), a fourth state (for example, heavy), and a fifth state (for example, super heavy).

According to various embodiments, the state of the second memory 313 (or the manner or pattern of employment of the second memory 313) may correspond to one of multiple states distinguished according to the ratio of the currently used capacity of the second memory 313 or the available capacity of the second memory 313 with reference to the total capacity of the second memory 313.

According to an embodiment, the state of the second memory 313, which is determined to be one of the first state, the second state, the third state, the fourth state, and the fifth state, may transition to another state associated with the current state according to whether or not at least one designated condition is satisfied. The at least one designated condition may be related to at least one of, for example, the following: the size of the available capacity of the second memory 313; the number of times at least one other application switches to a background state until a background application is unloaded from the second memory 313 (for example, reentry number); the swap size of the second memory 313 with regard to the first memory (for example, swap used); whether or not there is an application unloaded or un-preloaded (for example, killed) from the second memory 313; and the number of applications loaded or preloaded into the second memory 313 in a designated-type process (for example, cached process in FIG. 6).

For example, assuming that the second memory 313 is in the first state (for example, normal), the second memory 313 may change from the first state to a third state (for example, super light) if at least one of the following conditions is satisfied: a condition that the size of the available capacity of the second memory 313 exceeds a designated size (for example, 20%); a condition that the number of times at least one other application switches to a background condition until a background application is unloaded from the second memory 313 exceeds a predetermined number of times (for example, 25 times); and a condition that there is no application unloaded or un-preloaded from the second memory 313. As another example, assuming that the second memory 313 is in a fourth state (for example, heavy), the second memory 313 may change from the fourth state to a first state (for example, normal) if at least one of the following conditions is satisfied: a condition that the size of the available capacity of the second memory 313 exceeds a designated condition (for example, 10%); and a condition that the swap size of the second memory 313 with regard to the first memory is less than a designated size (for example, 70%).

According to an embodiment, the memory management module 323 may deliver information regarding the determined state of the second memory 313 to the boot-up booster module 325.

FIG. 5 illustrates a diagram of an example of determining the number of first slots in connection with an electronic device, according to an embodiment.

Referring to FIG. 2 and FIG. 5, the boot-up booster module 325 may determine the number (for example, first number) of first slots defined with regard to the third loading priority 313c. According to an embodiment, the first slots may be assigned to at least one application to be preloaded according to the third loading priority 313c, respectively. Based thereon, the number of first slots may correspond to the number of at least one application that may be preloaded into the second memory 313 according to the third loading priority 313c (or the number of processes of the at least one application).

In an embodiment, the boot-up booster module 325 may determine (325a) the number of first slots regarding the third loading priority 313c, based on information regarding the capacity of the second memory 313 and information regarding the state of the second memory 313 delivered from the memory management module 323. For example, if the second memory 313 has a capacity of 12 GB, and if the second memory 313 is in a first state (for example, normal), the boot-up booster module 325 may determine that the number of first slots regarding the third loading priority 313c is 14. It may be understood that, in such a case, the number of applications (or processes of applications) allowed to be preloaded according to the third loading priority 313c is 14. According to an embodiment, if the state of the second memory 313 (for example, the manner or pattern in which the user employs the second memory 313) determined by the memory management module 323 at each cycle (for example, first cycle) at which the number of applications executed in the electronic device 300 exceeds a threshold (for example, 20) is changed, the number of first slots regarding the third loading priority 313c determined by the boot-up booster module 325 may be changed so as to correspond to the changed state of the second memory 313.

In an embodiment, the boot-up booster module 325 may determine at least one application (for example, picked application) to be preloaded into the second memory 313 according to the third loading priority 313c with regard to a specific time interval, based on the determined number of first slots. For example, assuming that the number of first slots is a cutline, the boot-up booster module 325 may determine that at least one application included inside the cutline, among at least one application enumerated with regard to the specific time interval on a priority list 325b delivered from the app usage forecast module 321, is an application to be preloaded according to the third loading priority 313c. During this operation, the boot-up booster module 325 may determine an application to be preloaded, based on the third loading priority 313c, in such an order that applications forecasted to have a large number of executions with regard to the specific time interval on the priority list come first (or in such an order that applications enumerated at high ranks on the priority list with regard to the specific time interval come first).

According to an embodiment, after applications to be preloaded according to the third loading priority 313c are determined, the app usage forecast module 321 may perform an operation of delivering a priority list to the seedbed module 327 at a timepoint at which booting of the electronic device 300 is completed, and the app usage forecast module 321 may exclude the applications determined to be preloaded according to the third loading priority 313c from at least one application on the priority list, before delivering the priority list.

In an embodiment, if a preloading condition based on the third loading priority 313c is satisfied for a second period of time (for example, for one week after the current timepoint), the boot-up booster module 325 may preload, into the second memory 313, process data 325c of at least one application determined to be preloaded with regard to a time interval at the current timepoint, among at least one application determined to be preloaded according to the third loading priority 313c. For example, if the current timepoint is included in a first time interval inside the second period of time, the boot-up booster module 325 may preload, into the second memory 313, process data 325c of applications as many as the determined number of first slots, among at least one application forecasted to be executed with regard to the first time interval on the priority list. According to an embodiment, the boot-up booster module 325 may identify, as a preloading condition according to the third loading priority 313c, at least one of the following: a condition that booting of the electronic device 300 is completed (for example, "media scanner finished intent" is received); a condition that a designated time (for example, one hour)/cycle (for example, third cycle) arrives; a condition that the manner of employment of the second memory 313 (or pattern of employment thereof or state thereof) is changed; and a condition that at least one application currently executed by the electronic device 300 in the foreground or background all ends execution. According to various embodiments, during the operation of preloading at least one application determined to be preloaded according to the third loading priority 313c into the second memory 313, the boot-up booster module 325 may together preload resource data 325d related to execution of the corresponding application.

In an embodiment, at least one application preloaded according to the third loading priority 313c (for example, adj 850) may remain preloaded in the second memory 313 until at least one background application loaded according to the fifth loading priority 313e (for example, adj 900 to adj 906) and at least one application preloaded according to the fourth loading priority 313d (for example, adj 860) are all unloaded or un-preloaded. Based thereon, the at least one application preloaded according to the third loading priority 313c may have a preferential right regarding maintenance of the state in the second memory 313 (for example, maintaining preloaded state) compared with the at least one background application preloaded according to the fifth loading priority 313e and the at least one application preloaded according to the fourth loading priority 313d, and may exhibit a relatively large gain regarding the time necessary to execute the same (or time necessary for entry) or the response rate thereof. For example, a comparison between a case in which process data of a specific application is not preloaded and a case in which resource data of the specific application is preloaded into the second memory 313 according to the third loading priority 313c shows that, when the preloaded specific application is executed (or enters), a performance improvement (for example, execution rate improvement or response rate improvement) of about 30% or more may occur.

In an embodiment, the boot-up booster module 325 may un-preload some applications preloaded into the second memory 313 according to the third loading priority 313c. For example, if a specific application has been preloaded according to the third loading priority 313c, and if the specific application is not included within a cutline based on the number of first slots on a priority list 325b delivered from the app usage forecast module 321 for a designated time (for example, one hour)/at a designated cycle (for example, second cycle), the boot-up booster module 325 may un-preload the specific application from the second memory 313.

In an embodiment, the seedbed module 327 may determine at least one application (for example, seed application) to be preloaded according to the fourth loading priority 313d, based on the number of second slots defined with regard to the fourth loading priority 313d. According to various embodiments, the number of second slots may be determined up to a maximum of 100, based on the capacity of the second memory 313.

In an embodiment, the seedbed module 327 may determine that at least one application on a priority list (for example, a priority list from which applications determined to be preloaded according to the third loading priority 313c are excluded) delivered from the app usage forecast module 321 at a timepoint at which booting of the electronic device 300 is completed is at least one application 327a to be preloaded according to the fourth loading priority 313d.

In addition, the seedbed module 327 may determine that at least one application newly installed in the first memory of the electronic device 300 is at least one application 327a to be preloaded according to the fourth loading priority 313d.

According to an embodiment, the seedbed module 327 may determine that an application related to a recently ended process (recent kill) is at least one application 327a to be preloaded according to the fourth loading priority 313d. For example, if a process (for example, cached activity or cached recent) including a UI (for example, activity) is ended (killed), the seedbed module 327 may determine, after the ending, that an application related to the corresponding process is at least one application 327a to be preloaded according to the fourth loading priority 313d.

According to an embodiment, the seedbed module 327 may un-preload some applications preloaded according to the fourth loading priority 313d. For example, the seedbed module 327 may un-preload an application which has been preloaded according to the fourth loading priority 313d, and which has not been executed for a designated time (for example, 24 hours). According to various embodiments, if at least one application has been preloaded according to the fourth loading priority 313d, and if the same has been determined by the boot-up booster module 325 as a preloading target according to the third loading priority 313c within a designated time (for example, 24 hours), then the at least one application may be managed after the third loading priority 313c (for example, adj 850) is assigned thereto while being preloaded in the second memory 313. According to various embodiments, if at least one application preloaded according to the fourth loading priority 313d is executed with no assignment according to the third loading priority 313c, the corresponding application may be managed after the fifth loading priority 313e is assigned thereto, when the corresponding application switches to a background state after operating in a foreground state.

According to an embodiment, during an operation of preloading at least one application according to the fourth loading priority 313d, the seedbed module 327 may preload a process of the corresponding application in a designated type. For example, the seedbed module 327 may preload an application according to the fourth loading priority 313d in a process type (for example, seed process in FIG. 6) which requires less consumption of resources of the second memory 313.

Figure 6:
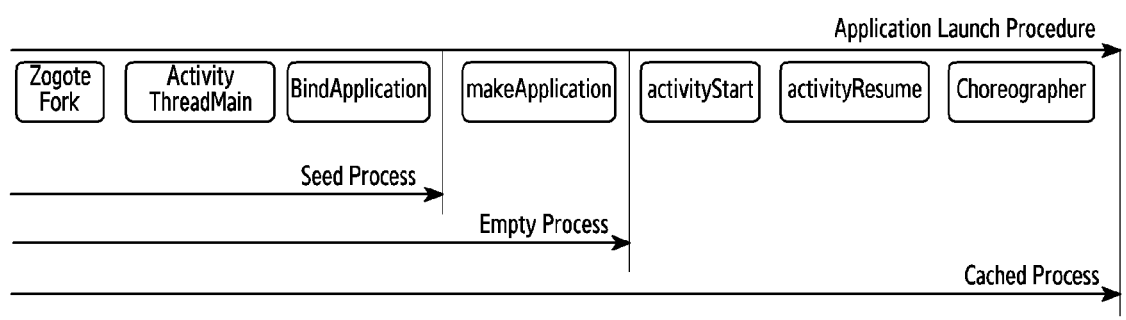
FIG. 6 illustrates a diagram of an example of a process step of an application preloaded by an electronic device, according to an embodiment.

FIG. 6 illustrates a diagram of an example process step of an application preloaded by an electronic device, according to an embodiment.

Referring to FIG. 2 and FIG. 6, a step of executing a process of the application requested when the application is executed (or enters) may include multiple steps. For example, the multiple process execution steps may include: a first step (for example, ZygoteFork) of replicating and preparing a virtual machine's code and information; a second step (for example, ActivityThreadMain) of producing a main message loop and an application thread (ActivityThread); a third step (for example, BindApplication) of producing an initial setting for application execution and a binder for communication; a fourth step (for example, MakeApplication) of registering the application thread produced in the second step and calling an application start/execution method (onCreate); a fifth step (for example, ActivityStart) in which the application lifecycle (activity lifecycle) of the operating system starts; a sixth step (for example, ActivityResume) of corresponding to a step immediately before application thread execution (activity running) after application thread start (activity start); and a seventh step (for example, choreographer) in which UI frame rendering is performed. Although examples of application process execution steps of a specific operating system (for example, Android) have been described above with reference to FIG. 6, the disclosure is not limited thereto. For example, the electronic device 300 may include various operating systems (for example, Android, Ubuntu, iOS, or Windows), and at least some (for example, name of steps or order of steps) of the above-mentioned application process execution steps may be changed according to the installed operating system.

According to an embodiment, an application preloaded into the second memory 313 according to the third loading priority 313c or the fourth loading priority 313d may be preloaded in a process type selected from a seed process, an empty process, and a cached process. In an embodiment, the seed process may include the first, second, and third application process execution steps. The empty process refers to a process including no application activity, and may include the first, second, third, and fourth application process execution steps. The cached process refers to a process including an application activity, and may include the first, second, third, fourth, fifth, sixth, and seventh application process execution steps.

Referring to a description made above, if a condition to preload into the second memory 313 according to the third loading priority 313c is satisfied for a second period of time (for example, for one week after the current timepoint), the boot-up booster module 325 may preload, into the second memory 313, at least one application forecasted to be executed in a time interval including the current timepoint, among at least one application determined to be preloaded according to the third loading priority 313c. During this operation, the boot-up booster module 325 may preload process data 325c of an application, which is to be preloaded according to the third loading priority 313c, into the second memory 313 in the empty process type. Alternatively, if an application to be preloaded according to the third loading priority 313c has been loaded or preloaded into the second memory 313 according to a loading priority other than the third loading priority 313c, the boot-up booster module 325 may change (or assign) the loading priority of the corresponding application from the other loading priority to the third loading priority 313c (for example, adj 850), and may manage the same.

Referring to another description made above, the seedbed module 327 may determine at least one application 327a to be preloaded into the second memory 313 according to the fourth loading priority 313d. In this regard, if an application loaded or preloaded into the second memory 313 according to a loading priority other than the fourth loading priority 313d is unloaded or un-preloaded, and if the process of the corresponding application includes an application UI (for example, activity), the seedbed module 327 may determine that the unloaded or un-preloaded application is an application 327a to be preloaded according to the fourth loading priority 313d (for example, adj 860).

FIG. 7 illustrates a diagram of exemplary memory parameters based on the memory state of an electronic device, according to an embodiment.

Referring to a description made above, a memory management module, according to an embodiment (for example, the memory management module 323 in FIG. 2), may monitor the manner or pattern in which the user employs a second memory (for example, the second memory 313 in FIG. 2), thereby determining the state of the second memory 313. For example, the memory management module 323 may determine the state of the second memory 313 by monitoring at least one of the following: the available capacity size of the second memory 313; the number of times at least one other application switches to a background state until a background application is unloaded from the second memory 313 (for example, reentry number); the swap size of the second memory 313 with regard to the first memory; whether or not there is an application unloaded or un-preloaded from the second memory 313; and the number of applications loaded or preloaded into the second memory 313 as a designated type of process (for example, cached process in FIG. 6).

Referring to FIG. 2 and FIG. 7, the memory management module 323 may apply different memory parameters to a first state (for example, normal), a second state (for example, light), a third state (for example, super light), a fourth state (for example, heavy), and a fifth state (for example, super heavy), respectively, which may be determined as a state of the second memory 313.

In this regard, the memory management module 323 may construct memory parameter information, in a database or table format, which can support stabilization or optimization of the electronic device 300 (or the second memory 313) with regard to each of the first state, the second state, the third state, the fourth state, and the fifth state. In addition, when determining the state of the second memory 313 (or when determining a state change), the memory management module 323 may apply a memory parameter corresponding to the state to employment of the second memory 313.

For example, if it is determined that the second memory 313 is in the second state (for example, light), the memory management module 323 may apply a memory parameter corresponding to the second state in connection with employment or management of the second memory 313. Such an operation may be for the purpose of maintaining a background application, which has been loaded according to the fifth loading priority 313e, in the loaded state to the largest extent because, if the second memory 313 is in the second state, the available capacity of the second memory 313 is secured to be relatively larger than when the same is in a different state (for example, first state (normal), fourth state (heavy), or fifth state (super heavy)). For example, the memory management module 323 may apply a memory parameter corresponding to the second state in the following manner: the memory management module 323 may increase (for example, maximum of 20%) the number of third slots (for example, cached slots) defined with regard to the fifth loading priority 313e; the memory management module 323 may configure the degree of swap utilization (for example, swappiness) of the second memory 313 with regard to the first memory to have a small value (for example, 120) compared with a different state (for example, first state (normal), fourth state (heavy), or fifth state (super heavy)); the memory management module 323 may configure the size of an I/O buffer (for example, readaround and/or faultaround) regarding the first memory to have a large value (for example, readaround 250K to 130K, and/or faultaround 60K or larger) compared with a different state (for example, first state (normal), fourth state (heavy), or fifth state (super heavy)); and the memory management module 323 may configure the maximum number of snapshot screens (for example, max_task_snapshot) of applications stored in the second memory 313 to be large (for example, 25 to 5) compared with a different state (for example, first state (normal), fourth state (heavy), or fifth state (super heavy)).

As another example, if it is determined that the second memory 313 has changed from the second state (for example, light) to the fourth state (for example, heavy), the memory management module 323 may apply a memory parameter corresponding to the fourth state, in order to secure an available capacity of the second memory 313, because the available capacity of the second memory 313 in the fourth state is smaller than the available capacity thereof in the second state. For example, the memory management module 323 may apply a memory parameter corresponding to the fourth state in the following manner: the memory management module 323 may decrease (for example, maximum of 20%) the number of third slots (for example, cached slots) defined with regard to the fifth loading priority 313e; the memory management module 323 may configure the degree of swap utilization (for example, swappiness) of the second memory 313 with regard to the first memory so as to increase (for example, 150); the memory management module 323 may configure the size of an I/O buffer (for example, readaround and/or faultaround) regarding the first memory so as to decrease (for example, readaround 60K to 30K, and/or faultaround 5K); and the memory management module 323 may configure the maximum number of snapshot screens (for example, max_task_snapshot) of applications stored in the second memory 313 so as to decrease (for example, 3).

Figure 8:
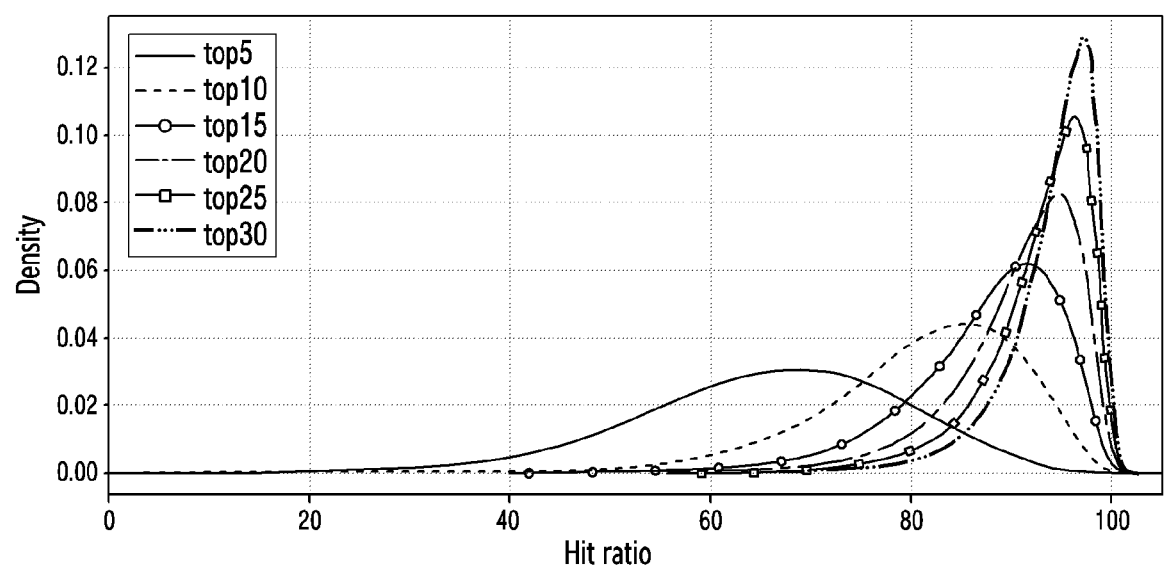
FIG. 8 illustrates a diagram illustrating a result of collecting big data regarding application inference of an electronic device according to an embodiment.

FIG. 8 illustrates a diagram of an example of a result of collecting big data regarding application inference of an electronic device, according to an embodiment.

Referring to FIG. 8, applications to be preloaded into a second memory (for example, the second memory 313 in FIG. 2) are inferred through a app usage forecast module (for example, the app usage forecast module 321 in FIG. 2), and a priority list including top N applications forecasted to be executed is produced based on the inference. As a result, it may be confirmed that the average (hit ratio) of actual executions of applications included in the priority list for a designed period of time (for example, second period of time) is 90% or higher, on average, given that the number of first slots defined according to the third loading priority is 15.

Figure 9:
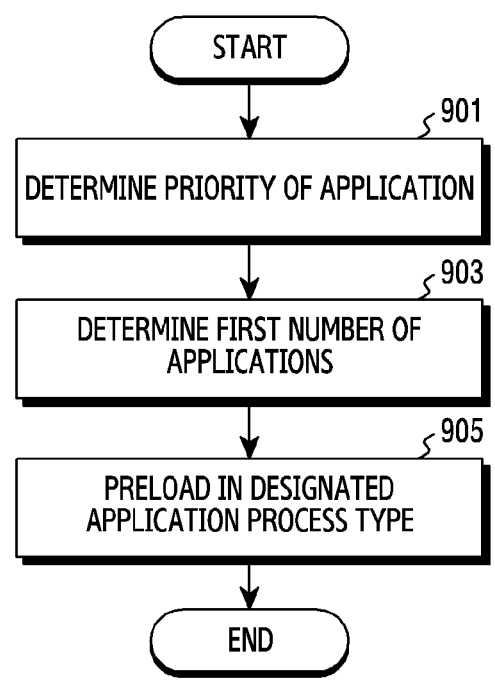
FIG. 9 illustrates a diagram of an exemplary method for preloading applications by an electronic device, according to an embodiment.

FIG. 9 illustrates a diagram of an exemplary method for preloading applications by an electronic device, according to an embodiment. The following descriptions with reference to FIG. 9 may be at least partially identical or similar to above descriptions with reference to FIG. 2 to FIG. 7, and part(s) of repeated descriptions may be omitted herein.

Referring to FIG. 9, in operation 901, a processor (for example, the processor 120 in FIG. 1, the processor 320 in FIG. 2, or the app usage forecast module 321 in FIG. 2) may determine a priority regarding multiple applications. For example, the processor may determine a priority regarding multiple applications stored in an electronic device (for example, the electronic device 101 in FIG. 1 or the electronic device 300 in FIG. 2) in order to determine at least one application to be preloaded into a second memory (for example, the second memory 313 in FIG. 2) according to a third loading priority (for example, the third loading priority 313c in FIG. 2).

According to an embodiment, as at least a part of determination of the priority regarding multiple applications, the processor may learn the history (for example, the number of executions with regard to each of multiple time intervals included in two preceding weeks) of at least one application executed for a first period of time (for example, for two weeks preceding a reference timepoint), and may acquire information regarding the number of executions of at least one application forecasted with regard to each of multiple time intervals included in a second period of time (for example, for one week after the current timepoint), based on the learning.

According to an embodiment, the processor may enumerate at least one application having a history of being executed for the first period of time in such an order that applications forecasted to have a large number of executions with regard to each of multiple time intervals inside the second period of time come first, thereby producing a priority list.

In operation 903, the processor may determine, based on a designated number, at least one application to be preloaded into the second memory according to the third loading priority in a specific time interval. In this regard, the designated number may refer to the number of first slots defined with regard to the third loading priority. The processor may consider the number of first slots as a cutline and may determine at least one application included inside the cutline with regard to the specific time interval, among at least one application on the priority list, as an application to be preloaded according to the third loading priority.

In operation 905, the processor may preload at least one application, which has been determined to be preloaded according to the third loading priority, into the second memory. For example, if a preloading condition based on the third loading priority is satisfied, the processor may preload process data (for example, application package) of at least one application forecasted to be executed in a time interval including the current timepoint, among the at least one determined application, into the second memory in the type of an empty process including no application UI (for example, an empty process including execution steps preceding activityStart in FIG. 6).

According to an embodiment, the processor may identify, as the preloading condition based on the third loading priority, at least one of the following: a condition that booting of the electronic device is completed (for example, "media scanner finished intent" is received); a condition that a designated time (for example, one hour)/cycle (for example, third cycle) arrives; a condition that the manner of employment of the second memory (or state of the second memory) is changed; and a condition that at least one application currently executed by the electronic device in a foreground state or in a background state all ends execution. If at least one of the above conditions is satisfied, the processor may perform preloading according to the third loading priority.

Figure 10:
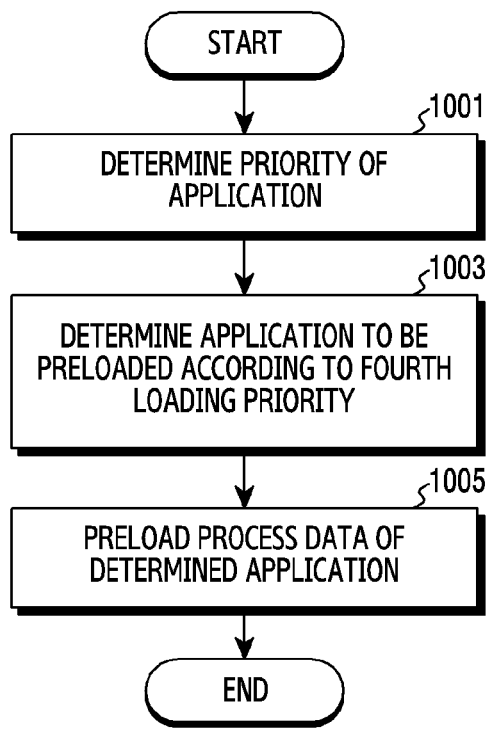
FIG. 10 illustrates a diagram of another exemplary method for preloading applications by an electronic device according to an embodiment.

FIG. 10 illustrates a diagram of another exemplary method for preloading applications by an electronic device, according to an embodiment. The following descriptions with reference to FIG. 10 may be at least partially identical or similar to the descriptions above, with reference to FIG. 2 to FIG. 7, and part(s) of repeated descriptions may be omitted herein.

Referring to FIG. 10, in operation 1001, a processor (for example, the processor 120 in FIG. 1, the processor 320 in FIG. 2, or the seedbed module 327 in FIG. 2) may determine a priority regarding multiple applications. For example, the processor may determine a priority regarding multiple applications stored in an electronic device (for example, the electronic device 101 in FIG. 1 or the electronic device 300 in FIG. 2) in order to determine at least one application to be preloaded into a second memory (for example, the second memory 313 in FIG. 2) according to a fourth loading priority (for example, the fourth loading priority 313d in FIG. 2). During this operation, the processor may refer to a priority list from which applications to be preloaded according to the third loading priority (for example, the third loading priority 313c in FIG. 2) described above are excluded.

In operation 1003, the processor may determine, based on a designated number, at least one application to be preloaded into the second memory according to the fourth loading priority. The designated number may refer to the number of second slots defined with regard to the fourth loading priority, for example, and may be determined to be up to a maximum of 100 based on the capacity of the second memory. According to an embodiment, the processor may determine at least one application, the number of which corresponds to the number of the second slots, as applications to be preloaded into the second memory according to the fourth priority, with reference to the priority list (for example, a priority list from which applications determined to be preloaded according to the third loading priority are excluded).

In operation 1005, the processor may preload, into the second memory, process data (for example, application package) of at least one application determined to be preloaded according to the fourth loading priority. According to various embodiments, the processor may preload process data of the at least one determined application as a seed process (for example, a seed process including execution steps completed up to BindApplication in FIG. 6). According to various embodiments, the data size of at least one application process preloaded into the second memory according to the fourth loading priority may be smaller than the data size of at least one application process preloaded according to the third loading priority.

An electronic device according to various embodiments described above may include: a first memory in which multiple applications are stored; a second memory; and at least one processor operatively connected to the first memory and the second memory.

According to various embodiments, the at least one processor may determine, based on a history of usage of the multiple applications for a first period of time, a priority of the multiple applications with regard to each of multiple time intervals included in a second period of time following the first period of time, and may preload a predetermined first number of applications into the second memory based on the priority if a designated condition is satisfied.

According to various embodiments, the at least one processor may preload a first list of applications into the second memory if the designated condition is satisfied in a first time interval among the multiple time intervals, and may preload a second list of applications into the second memory if the designated condition is satisfied in a second time interval among the multiple time intervals.

According to various embodiments, the at least one processor may determine the state of the second memory at each first cycle at which the number of executions of the multiple applications exceeds a designated threshold.

According to various embodiments, the at least one processor may determine the first number based on at least one of the capacity of the second memory and the state of the second memory.

According to various embodiments, the at least one processor may change the first number if it is determined that the state of the second memory has changed.

According to various embodiments, the at least one processor may produce, at a designated second cycle, a list enumerating the multiple applications based on information regarding the number of times the multiple applications are forecasted to be executed in each of multiple time intervals included in the second period of time.

According to various embodiments, the at least one processor may determine a priority of the multiple applications based on the list.

According to various embodiments, the at least one processor may determine the first number of applications to be preloaded into the second memory in such an order that applications having a high priority, among the multiple applications enumerated on the list, come first.

According to various embodiments, the at least one processor may preload a second number of applications, excluding the first number of applications among the multiple applications enumerated on the list, into the second memory; and may determine that the first number of applications are preferentially preloaded into the second memory compared with the second number of applications.

According to various embodiments, the at least one processor may preload, into the second memory, an application installed in the first memory as at least a part of the second number of applications.

According to various embodiments, the at least one processor may maintain the first number of applications preloaded until the second number of applications are unpreloaded.

According to various embodiments, the at least one processor may identify, as at least a part of the designated condition, at least one of a condition that booting of the electronic device is completed, a condition that a designated third cycle arrives, a condition that the state of the second memory is changed, and a condition that execution of at least one application by the electronic device is ended.

A method for preloading an application of an electronic device according to various embodiments described above may include the operations of: determining, based on a history of usage of multiple applications stored in a first memory for a first period of time, a priority of the multiple applications with regard to each of multiple time intervals included in a second period of time following the first period of time; and preloading a predetermined first number of applications into the second memory based on the priority if a designated condition is satisfied.

According to various embodiments, the operation of preloading a predetermined first number of applications into the second memory may include an operation of preloading a first list of applications into the second memory if the designated condition is satisfied in a first time interval among the multiple time intervals, and preloading a second list of applications into the second memory if the designated condition is satisfied in a second time interval among the multiple time intervals.

According to various embodiments, the method for preloading an application may further include an operation of determining the state of the second memory at each first cycle at which the number of executions of the multiple applications exceeds a designated threshold.

According to various embodiments, the method for preloading an application may further include an operation of determining the first number based on at least one of the capacity of the second memory and the state of the second memory.

According to various embodiments, the operation of determining the first number may include an operation of changing the first number if it is determined that the state of the second memory has changed.

According to various embodiments, the operation of determining the priority of the multiple applications may include the operation of: producing, at a designated second cycle, a list enumerating the multiple applications based on information regarding the number of times the multiple applications are forecasted to be executed in each of multiple time intervals included in the second period of time; and determining the priority of the multiple applications based on the list.

According to various embodiments, the method for preloading an application may further include an operation of determining the first number of applications to be preloaded into the second memory in such an order that applications having a high priority, among the multiple applications enumerated on the list, come first.

According to various embodiments, the method for preloading an application may further include the operations of: preloading a second number of applications, excluding the first number of applications among the multiple applications enumerated on the list, into the second memory; and determining that the first number of applications are preferentially preloaded into the second memory compared with the second number of applications.

According to various embodiments, the operation of preloading a second number of applications into the second memory may include an operation of preloading, into the second memory, an application installed in the first memory as at least a part of the second number of applications.

According to various embodiments, the operation of determining that the first number of applications are preferentially preloaded into the second memory compared with the second number of applications may include an operation of maintaining the first number of applications preloaded until the second number of applications are un-preloaded.

According to various embodiments, the operation of preloading a predetermined first number of applications into the second memory may include an operation of identifying, as at least a part of the designated condition, at least one of a condition that booting of the electronic device is completed, a condition that a designated third cycle arrives, a condition that the state of the second memory is changed, and a condition that execution of at least one application by the electronic device is ended.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a first memory configured to store multiple applications;
   a second memory; and
   at least one processor operatively connected to the first memory and the second memory, wherein
   the at least one processor is configured to:
      determine, based on a history of usage of the multiple applications for a first period of time, a priority of the multiple applications with regard to each of multiple time intervals included in a second period of time following the first period of time, the priority of the multiple applications with regard to a first time interval among the multiple time intervals is enumerated in a first list and the priority of the multiple applications with regard to a second time interval is enumerated in a second list;
      determine a state of the second memory from among five states defining a pattern of employment of the second memory at each first cycle that total sum of a number of executions of the multiple applications exceeds a designated threshold, the five states are distinguished based on ratio of currently used capacity of the second memory or ratio of available capacity of the second memory with reference to total capacity of the second memory;
      identifying, as at least a part of a designated condition, at least one of: a booting of the electronic device is completed, a designated cycle arrives, the state of the second memory is changed from among the five states, and execution of at least one application, by the electronic device, has ended; and
      preload a predetermined first number of first applications among the multiple applications enumerated in the first list into the second memory based on the priority with regard to the first list if the designated condition is identified in the first time interval, and preload the predetermined first number of second applications among the multiple applications enumerated in the second list into the second memory based on the priority with regard to the second list if the designated condition is identified in the second time interval.

2. The electronic device of claim 1, wherein the at least one processor is further configured to:
   determine the predetermined first number based on at least one of a capacity of the second memory and the state of the second memory.

3. The electronic device of claim 1, wherein the at least one processor is further configured to:
   change the predetermined first number if it is determined that the state of the second memory has changed.

4. The electronic device of claim 1, wherein the at least one processor is further configured to:
   produce, at a designated second cycle, a list enumerating the multiple applications, based on information regarding a number of times the multiple applications are forecasted to be executed in each of multiple time intervals included in the second period of time; and
   determine a priority of the multiple applications based on the list.

5. The electronic device of claim 4, wherein the at least one processor is configured to:
   determine the predetermined first number of the first applications or the second applications to be preloaded into the second memory, wherein applications having a high priority, among the multiple applications enumerated on the list, are preloaded first.

6. The electronic device of claim 4, wherein the at least one processor is further configured to:
   preload a predetermined second number of third applications, excluding the predetermined first number of the first applications or the second applications among the multiple applications enumerated on the list, into the second memory; and
   determine that the predetermined first number of the first applications or the second applications are preferentially preloaded into the second memory compared with the predetermined second number of the third applications.

7. The electronic device of claim 6, wherein the at least one processor is further configured to:
   preload, into the second memory, an application installed in the first memory as at least a part of the predetermined second number of the third applications.

8. The electronic device of claim 6, wherein the at least one processor is further configured to:
   maintain the predetermined first number of the first applications or the second applications preloaded until the predetermined second number of the third applications are un-preloaded.

9. A method for preloading an application of an electronic device, the method comprising:
- determining, based on a history of usage of multiple applications stored in a first memory for a first period of time, a priority of the multiple applications with regard to each of multiple time intervals included in a second period of time following the first period of time, the priority of the multiple applications with regard to a first time interval among the multiple time intervals is enumerated in a first list and the priority of the multiple applications with regard to a second time interval is enumerated in a second list;
- determining a state of a second memory from among five states defining a pattern of employment of the second memory at each first cycle that total sum of a number of executions of the multiple applications exceeds a designated threshold, the five states are distinguished based on ratio of currently used capacity of the second memory or ratio of available capacity of the second memory with reference to total capacity of the second memory;
- identifying, as at least a part of a designated condition, at least one of: a booting of the electronic device is completed, a designated cycle arrives, the state of the second memory is changed from among the five states, and execution of at least one application, by the electronic device, has ended; and
- preloading a predetermined first number of first applications among the multiple applications enumerated in the first list into the second memory based on the priority with regard to the first list if the designated condition is identified in the first time interval, and preloading the predetermined first number of second applications among the multiple applications enumerated in the second list into the second memory based on the priority with regard to the second list if the designated condition is identified in the second time interval.

10. The method of claim 9, further comprising:
- determining the predetermined first number of applications based on at least one of a capacity of the second memory and the state of the second memory.

11. The method of claim 10, wherein the determining the predetermined first number comprises: changing the predetermined first number in response to determining that the state of the second memory has changed.

12. The method of claim 9, wherein the determining the priority of the multiple applications further comprises:
- producing, at a designated second cycle, a list enumerating the multiple applications, based on information regarding a number of times the multiple applications are forecasted to be executed in each of multiple time intervals included in the second period of time; and
- determining the priority of the multiple applications based on the list.

13. The method of claim 12, further comprising:
- determining the predetermined first number of the first applications or the second applications to be preloaded into the second memory, wherein applications having a high priority, among the multiple applications enumerated on the list, are preloaded first.

14. The method of claim 12, further comprising:
- preloading a predetermined second number of third applications, excluding the predetermined first number of the first applications or the second applications among the multiple applications enumerated on the list, into the second memory; and
- determining that the predetermined first number of the first applications or the second applications are preferentially preloaded into the second memory compared with the predetermined second number of the third applications.

15. The method of claim 14, wherein the preloading the predetermined second number of the third applications into the second memory further comprises:
- preloading, into the second memory, an application installed in the first memory as at least a part of the predetermined second number of the third applications.

16. The method of claim 14, wherein the determining that the predetermined first number of the first applications or the second applications are preferentially preloaded into the second memory compared with the predetermined second number of the third applications further comprises:
- maintaining the predetermined first number of the first applications or the second applications preloaded until the predetermined second number of the third applications are un-preloaded.

* * * * *